(No Model.)

J. G. DODD.
FLY PAPER HOLDER.

No. 511,689. Patented Dec. 26, 1893.

WITNESSES.
C. M. Werlé
H. C. Peck

INVENTOR.
Jos. Geo. Dodd
O. E. Duff
Attorney

THE NATIONAL LITHOGRAPHING COMPANY,
WASHINGTON, D. C.

UNITED STATES PATENT OFFICE.

JOSEPH GEORGE DODD, OF EGREMONT, ENGLAND.

FLY-PAPER HOLDER.

SPECIFICATION forming part of Letters Patent No. 511,689, dated December 26, 1893.

Application filed May 24, 1893. Serial No. 475,349. (No model.)

*To all whom it may concern:*

Be it known that I, JOSEPH GEORGE DODD, a subject of the Queen of Great Britain and Ireland, residing at Egremont, in the county of Chester, England, have invented an Improved Device for Holding Fly-Papers and the Like, of which the following is a specification.

This invention relates to an improved fly paper holder for keeping fly papers and other absorbent materials impregnated with poison in a moist state for a lengthened period.

The apparatus comprises a vertical tubular reservoir closed at its upper end and having removably secured at its lower end a shallow dish so arranged that liquid can escape from the reservoir into the dish through a small aperture in the bottom of the reservoir, so as to maintain a practically constant level of liquid in the dish in the manner well understood. Around the vertical tubular reservoir a piece or tube of absorbent material previously impregnated with poison is placed, so that its lower end dips into the water in the dish, its upper part being held in position by an elastic band. The moisture will be drawn up by capillary attraction, and when the level of the water in the dish falls sufficiently to uncover the aperture, water will flow from the reservoir till the aperture is again covered. Thus as long as there is water in the reservoir the fly paper or other absorbent will be kept moist and efficient.

I will now proceed to describe my invention by reference to the accompanying sheet of drawings.

Figure 1:
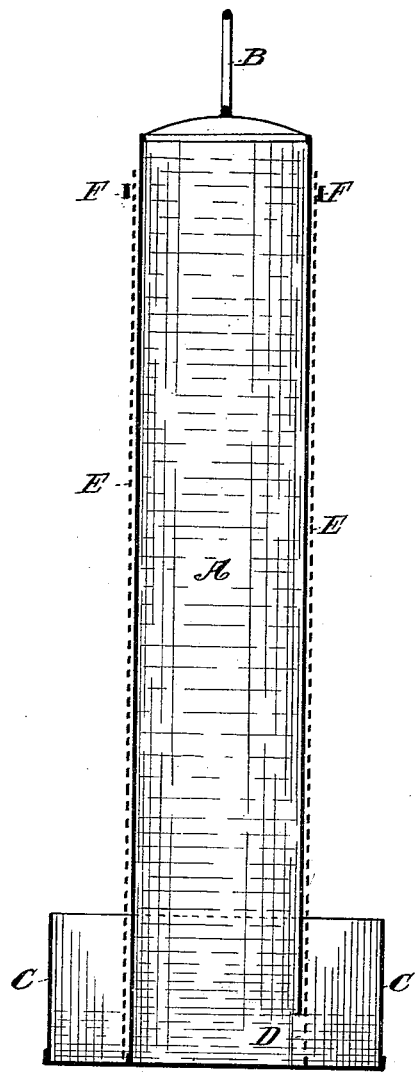
Figure 2:
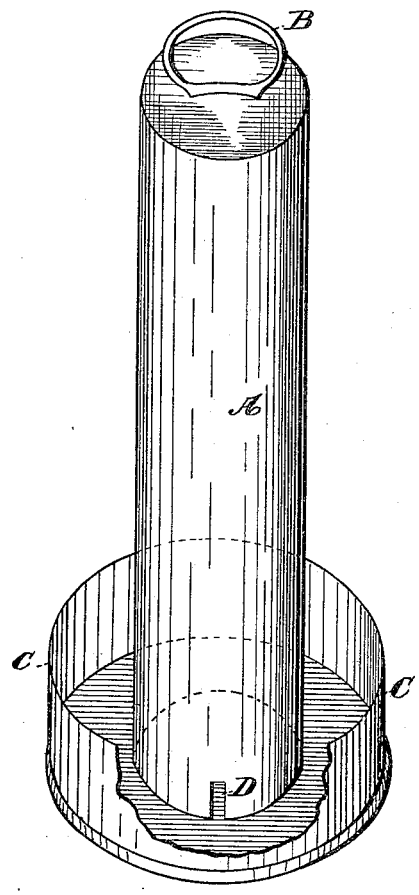

Figure 1 is a vertical central section of the apparatus with the fly paper or other absorbent material in position; and Fig. 2 is a perspective view of the apparatus.

A is the vertical tubular reservoir closed at its upper end and provided with a ring or hook B by which it may be suspended.

C is the dish which may be a shallow circular trough or cistern made about double the diameter of the tube A.

D is the aperture in the form of a vertical slot, in the lower end of the reservoir A, which slot extends upward to about one-third the depth of the dish C, so that when the reservoir is filled with water, by placing the dish over it and inverting it water will flow into the said dish C until the level is about equal to the height of the slot D. The flow will then cease until the moisture is extracted, then a further supply will be admitted. The trough or pan can be detachably secured to the lower end of the reservoir in any suitable manner. As liquid may be discharged from the reservoir by expansion of the air therein, the trough C is made of sufficient capacity to allow for this in case the apparatus may be suspended in a heated atmosphere. When the apparatus is cooled down the liquid so discharged will be withdrawn or sucked up into the reservoir again.

E is the fly paper or other poison impregnated material which is placed around the reservoir A. Its upper end when in sheet form is retained in position by a loose elastic band F while its lower end rests on the bottom of the trough C in the water contained therein.

The absorbent nature and capillary attraction causes the material to be moistened over its whole surface and as evaporation takes place or the moisture is extracted by insects a fresh supply is sucked up from the dish C. By the time the whole of the water has been consumed the ordinary fly paper will probably be exhausted.

The outer surface of the reservoir A may be made of porous material such as unglazed earthen ware, and liquid poison may be used in place of water so as to dispense with poisoned paper or paper rolls.

By my arrangement insects that alight on the vertical reservoir and absorb the poisoned fluid will in most cases fall into the trough or cistern C instead of being scattered about as is usual when an ordinary fly paper is placed on a shallow vessel.

What I claim is—

1. A device for holding fly papers and other like absorbent poison impregnated materials, comprising a vertical liquid reservoir surrounded by said paper or material and a dish into which the lower parts of said reservoir and said paper or other material dip said reservoir opening into the dish substantially as described.

2. In a device for holding fly papers or other like absorbent materials the combination of a vertical tubular reservoir having a side opening at its lower end and, a dish surrounding the lower end of said reservoir of sufficient capacity to hold any discharge therefrom, and means for holding said paper or material in position on the reservoir entirely on the exterior of the reservoir substantially as described.

In testimony whereof I have signed my name to this specification in the presence of two subscribing witnesses.

JOSEPH GEORGE DODD.

Witnesses:
JOHN J. HARLEY,
   27 *Old Haymarket, Liverpool.*
F. M. O. SCOTT,
   89 *Victoria Street, Liverpool.*